(12) United States Patent
de Palma et al.

(10) Patent No.: US 7,483,252 B2
(45) Date of Patent: Jan. 27, 2009

(54) CIRCUIT PROTECTION DEVICE

(75) Inventors: Jean-Francois de Palma, Arlington, MA (US); Jerry L. Mosesian, Newburyport, MA (US)

(73) Assignee: Ferraz Shawmut S.A., Villeurbanne (FR)

( * ) Notice: Subject to any disclaimer, the term of this patent is extended or adjusted under 35 U.S.C. 154(b) by 127 days.

(21) Appl. No.: 11/566,705

(22) Filed: Dec. 5, 2006

(65) Prior Publication Data

US 2008/0130180 A1    Jun. 5, 2008

(51) Int. Cl.
*H02H 1/00*    (2006.01)
(52) U.S. Cl. .................................... 361/127
(58) Field of Classification Search ........... 361/127
See application file for complete search history.

(56) References Cited

U.S. PATENT DOCUMENTS

| | | | |
|---|---|---|---|
| 4,288,833 A | 9/1981 | Howell | 361/124 |
| 4,493,005 A | 1/1985 | Lange | 361/124 |
| 4,538,201 A | 8/1985 | Wuyts et al. | 361/124 |
| 4,562,323 A | 12/1985 | Belbel et al. | 218/117 |
| 4,652,964 A | 3/1987 | Ziegenbein | 361/54 |
| 4,691,197 A * | 9/1987 | Damiano et al. | 340/638 |
| 4,720,759 A | 1/1988 | Tabei | 361/105 |
| 4,733,324 A | 3/1988 | George | 361/118 |
| 4,739,436 A | 4/1988 | Stefani et al. | 361/56 |
| 4,801,772 A | 1/1989 | Bratkowski et al. | 200/151 |
| 4,809,124 A | 2/1989 | Kresge | 361/58 |
| 4,887,183 A | 12/1989 | Biederstedt et al. | 361/124 |
| 4,901,183 A | 2/1990 | Lee | 361/56 |

(Continued)

FOREIGN PATENT DOCUMENTS

DE    42 41 311 C2    6/1994

(Continued)

OTHER PUBLICATIONS

Harris Semiconductor, "Transient Voltage Suppression Devices," Transient V-I Characteristics Curves, p. 4-57, 1995. no month.

(Continued)

*Primary Examiner*—Ronald W Leja
(74) *Attorney, Agent, or Firm*—Kusner & Jaffe

(57) ABSTRACT

A voltage suppression device for suppressing voltage surges in an electrical circuit, comprised of a voltage sensitive element having a predetermined voltage rating, the voltage sensitive element increasing in temperature as voltage applied across the voltage sensitive element exceeds the voltage rating. Terminals are provided for electrically connecting the voltage sensitive element between a power line of an electrical circuit and a ground or neutral line of the electrical circuit. A normally closed, thermal switch is electrically connected in series with the voltage sensitive element between one line of the electrical circuit and the voltage sensitive element, the thermal switch being thermally coupled to the voltage sensitive element wherein the thermal switch moves from a normally closed position to an open position to form a gap between the thermal switch and the voltage sensitive element when the temperature of the voltage sensitive element reaches a level indicating an over-voltage condition. When the thermal switch moves to the open position, residual follow on current is shunted by a fuse element connected in parallel with the thermal switch. Current flows through the fuse element until the fuse element melts. Electrical arcing is contained inside the fuse until extinguished.

33 Claims, 5 Drawing Sheets

U.S. PATENT DOCUMENTS

| | | | | |
|---|---|---|---|---|
| 5,043,527 A | 8/1991 | Carpenter, Jr. | | 174/2 |
| 5,073,678 A | 12/1991 | Carpenter, Jr. | | 174/2 |
| 5,101,180 A | 3/1992 | Frey | | 333/12 |
| 5,276,422 A * | 1/1994 | Ikeda et al. | | 337/28 |
| 5,311,393 A | 5/1994 | Bird | | 361/104 |
| 5,359,657 A | 10/1994 | Pelegris | | 379/412 |
| 5,367,279 A * | 11/1994 | Sakai | | 337/104 |
| 5,379,176 A | 1/1995 | Bacon et al. | | 361/106 |
| 5,379,177 A | 1/1995 | Bird | | 361/118 |
| 5,392,188 A | 2/1995 | Epstein | | 361/118 |
| 5,404,126 A | 4/1995 | Kasai et al. | | 338/21 |
| 5,495,383 A | 2/1996 | Yoshioka et al. | | 361/56 |
| 5,519,564 A | 5/1996 | Carpenter, Jr. | | 361/127 |
| 5,532,897 A | 7/1996 | Carpenter, Jr. | | 361/118 |
| 5,574,614 A | 11/1996 | Busse et al. | | 361/119 |
| 5,644,283 A | 7/1997 | Grosse-Wilde et al. | | 338/20 |
| 5,675,468 A | 10/1997 | Chang | | 361/119 |
| 5,699,818 A | 12/1997 | Carpenter, Jr. | | 135/16 |
| 5,796,183 A | 8/1998 | Hourmand | | 307/116 |
| 5,808,850 A | 9/1998 | Carpenter, Jr. | | 361/127 |
| 5,901,027 A | 5/1999 | Ziegler et al. | | 361/124 |
| 5,933,310 A * | 8/1999 | Eggendorfer | | 361/104 |
| 5,956,223 A | 9/1999 | Banting | | 361/117 |
| 6,040,971 A | 3/2000 | Martenson et al. | | 361/118 |
| 6,055,147 A * | 4/2000 | Jeffries et al. | | 361/103 |
| 6,211,770 B1 | 4/2001 | Coyle | | 361/117 |
| 6,430,019 B1 | 8/2002 | Martenson et al. | | 361/124 |
| 6,556,410 B1 | 4/2003 | Manning et al. | | 361/118 |
| 6,678,138 B2 | 1/2004 | Glaser et al. | | 361/103 |
| 6,683,770 B1 | 1/2004 | Marsh | | 361/111 |
| 6,765,777 B2 | 7/2004 | Cantagrel | | 361/103 |
| 6,829,129 B2 | 12/2004 | Marsh et al. | | 361/111 |
| 2005/0180080 A1 | 8/2005 | Harris | | 361/111 |
| 2005/0202358 A1 | 9/2005 | Donnelly | | 431/22 |
| 2005/0231872 A1 | 10/2005 | Schimanski et al. | | 361/91.9 |
| 2006/0125595 A1 | 6/2006 | Lu | | 337/186 |

FOREIGN PATENT DOCUMENTS

| | | |
|---|---|---|
| EP | 0 716 493 B1 | 6/1996 |
| EP | 1 077 452 A2 | 2/2001 |
| EP | 1 587 188 A1 | 10/2005 |
| JP | 03-073501 | 3/1991 |
| JP | 06-311643 | 11/1994 |
| JP | 11-133084 | 5/1999 |

OTHER PUBLICATIONS

Phoenix Contact, Extract from the online catalog for VAL-CP-3S-350VF, Phoenix Contact GmbH & Co. KG, www.phoenixcontact.com, PDF Version, pp. 1-6, Jun. 23, 2006.

Phoenix Contact, Extract from the online catalog for VAL-CP-350VF-ST, Phoenix Contact GmbH & Co. KG, www.phoenixcontact.com, PDF Version, pp. 1-6, Jun. 23, 2006.

* cited by examiner

CIRCUIT PROTECTION DEVICE

FIELD OF THE INVENTION

The present invention relates generally to circuit protection devices, and more particularly to a device that suppresses transient current/voltage surges.

BACKGROUND OF THE INVENTION

Many of today's highly sensitive electronic components, such as computer and computer-related equipment, that are used in commercial and residential applications contain transient voltage surge suppression (TVSS) devices. These devices protect sensitive and/or expensive electronic circuits and components from damage from over-voltage fault conditions. Such transient voltage surge suppression systems are typically designed for moderate fault conditions expected in normal use. In this respect, such systems are designed to suppress relatively minor fault conditions, but are not designed to protect against major over-voltage conditions. Examples of major over-voltage conditions include those that may occur from losing the system neutral or ground termination, or from repetitive current pulses as from lightning strikes. Such major over-voltage conditions can have catastrophic effects on sensitive electronic circuits and components. To prevent such fault conditions from reaching and damaging electronic circuits, components and equipment, it has been known to utilize larger voltage surge suppression devices. These devices are typically deployed at a building's incoming electrical service power lines, or within a building's power distribution grid to control power surges in the electrical lines to the building, or in the electrical lines to specific floors of the building. Such voltage surge suppression devices typically include a plurality of metal-oxide varistors (MOVs) connected in parallel between a service power line and a ground or neutral line, or between a neutral line and a ground line.

MOVs are non-linear, electronic devices made of ceramic-like materials comprising zinc-oxide grains and a complex amorphous inner granular material. Over a wide range of current the voltage remains within a narrow band commonly called the varistor voltage. A log-log plot of the instantaneous voltage in volts versus the instantaneous current in amps yields a nearly horizontal line. It is this unique current-voltage characteristic that makes MOVs ideal devices for protection of sensitive electronic circuits against electrical surges, over-voltages, faults or shorts.

When exposed to voltages exceeding their voltage value, MOVs become highly conductive devices that absorb and dissipate the energy related to the over-voltage and simultaneously limit dump current to a neutral line or ground plane. If an over-voltage condition is not discontinued, the MOVs will continue to overheat and can ultimately fail catastrophically, i.e., rupture or explode. Such catastrophic failure may destroy the sensitive electronic equipment and components in the vicinity of the MOVs. The destruction of electrical equipment or components in the electrical distribution system can disrupt power to buildings or floors for prolonged periods of time until such components are replaced or repaired. Moreover, the failure of the MOVs in a surge suppression system may allow the fault condition to reach the sensitive electronic equipment the system was designed to protect.

In U.S. Pat. No. 6,040,971 entitled CIRCUIT PROTECTION DEVICE, issued Mar. 21, 2000, there is disclosed a voltage suppression device for protecting an array of metal oxide varistors in a surge suppression system. The device was operable to drop offline an entire array of MOVs in the event that a voltage surge reached a level wherein one or more of the MOVs in the array might catastrophically fail. In the disclosed device and system, a trigger MOV was designed to have a lower voltage rating than any of the MOVs in the array. Thus, the entire array would drop offline in the event that a surge condition exceeded the voltage rating of the trigger MOV. In some instances, however, it may be desirable to maintain the array of MOVs active and to drop offline only those MOVs sensing a voltage surge exceeding the voltage rating of that particular MOV.

In U.S. Pat. No. 6,430,019 entitled CIRCUIT PROTECTION DEVICE, issued Aug. 6, 2002, and fully incorporated herein by reference, there is disclosed a circuit protection device that includes a non-conductive barrier that moves into a gap between a thermal switch and a voltage sensitive element when the thermal switch moves to an open position. The non-conductive barrier prevents line voltage surges from arcing between the thermal switch and the voltage sensitive element. The non-conductive barrier is biased by extension springs which bear on solder joints connecting the thermal switch to the voltage sensitive element. This condition has the potential to stress the solder joints leading to premature wear out or failure.

The present invention provides a circuit protection device, and a transient voltage surge suppression system incorporating such device, to protect an electrical system from catastrophic failure due to excessive over-voltage conditions or repetitive fault conditions.

SUMMARY OF THE INVENTION

In accordance with the present invention, there is provided a voltage suppression device for suppressing voltage surges in an electrical circuit, said device comprised of: (a) a voltage sensitive element having a first surface and a second surface and a predetermined voltage rating across said first and second surfaces, said voltage sensitive element increasing in temperature as voltage applied across said first and second surfaces exceeds said voltage rating; (b) a first terminal having one end electrically connected to said first surface of said voltage sensitive element and another end electrically connectable to a first line of the electrical circuit; (c) a thermal element electrically connected to said second surface of said voltage sensitive element, said thermal element being an electrically conductive solid at room temperature and having a predetermined softening temperature; (d) a second terminal having one end in electrical connection with said second surface of said voltage sensitive element and another end electrically connectable to a second line of the electrical circuit, said voltage sensitive element sensing the voltage drop between said first and second lines of the electrical circuit, said second terminal being maintained in electrical contact with said voltage sensitive element by said thermal element and being biased away therefrom, wherein said second terminal moves away from electrical contact with said voltage sensitive element and breaks a first electrical current path if an over-voltage condition sensed by said voltage sensitive element exceeds the voltage rating of said voltage sensitive element and causes said voltage sensitive element to heat said thermal element beyond its softening point; (e) a fuse element having one end in electrical connection with said second surface of said voltage sensitive element and another end electrically connectable to the second line of the electrical circuit, wherein a second electrical current path parallel to the first electrical current path is broken when the fuse element melts; and (f) a housing enclosing said voltage sensitive element, said one ends of said first and second terminals, and said thermal element.

In accordance with another aspect of the present invention, there is provided a voltage suppression device for suppressing voltage surges in an electrical circuit, said device comprised of: (a) a voltage sensitive element having a predetermined voltage rating, said voltage sensitive element increasing in temperature as voltage applied across said voltage sensitive element exceeds said voltage rating; (b) terminals for electrically connecting said voltage sensitive element between a first line of the electrical circuit and a second line of the electrical circuit; (c) a normally closed, thermal switch comprised of one end of one of said terminals, a surface of said voltage sensitive element and a thermal element said one end of one of said terminals being maintained in electrical contact with said surface of said voltage sensitive element by said thermal element, said thermal switch being electrically connected in series with said voltage sensitive element between said first line of said electrical circuit and said voltage sensitive element, said thermal switch being thermally coupled to said voltage sensitive element wherein said one of said terminals moves from a normally closed position wherein said one of said terminals is maintained in electrical contact with said surface of said voltage sensitive element to an open position wherein said one of said terminals moves out of electrical contact with said surface of said voltage sensitive element to form a gap between said one of said terminals and said voltage sensitive element when the temperature of said voltage sensitive element reaches a level causing said thermal element to melt; and (d) a fuse element having one end electrically connected to said voltage sensitive element and another end electrically connectable to said first line of the electrical circuit.

It is an object of the present invention to provide a circuit protection device to protect sensitive circuit components and systems from current and voltage surges.

It is another object of the present invention to provide a circuit protection device as described above to prevent catastrophic failure of a transient voltage surge suppression (TVSS) system within a circuit that may occur from repetitive circuit faults or from a single fault of excessive proportion.

A further object of the present invention is to provide a circuit protection device as described above that includes a current suppression device and a voltage suppression device.

Another object of the present invention is to provide a circuit protection device as described above for protecting a transient voltage surge suppression system having metal-oxide varistors (MOVs).

A still further object of the present invention is to provide a circuit protection device as described above that includes a metal-oxide varistor as a circuit-breaking device.

A still further object of the present invention is to provide a circuit protection device as described above that is modular in design and easily replaceable in a circuit.

These and other objects and advantages will become apparent from the following description of a preferred embodiment of the present invention taken together with the accompanying drawings.

BRIEF DESCRIPTION OF THE DRAWINGS

The invention may take physical form in certain parts and arrangement of parts, an embodiment of which will be described in detail in the specification and illustrated in the accompanying drawings which form a part hereof, and wherein.

DETAILED DESCRIPTION OF PREFERRED EMBODIMENT

Figure 1:
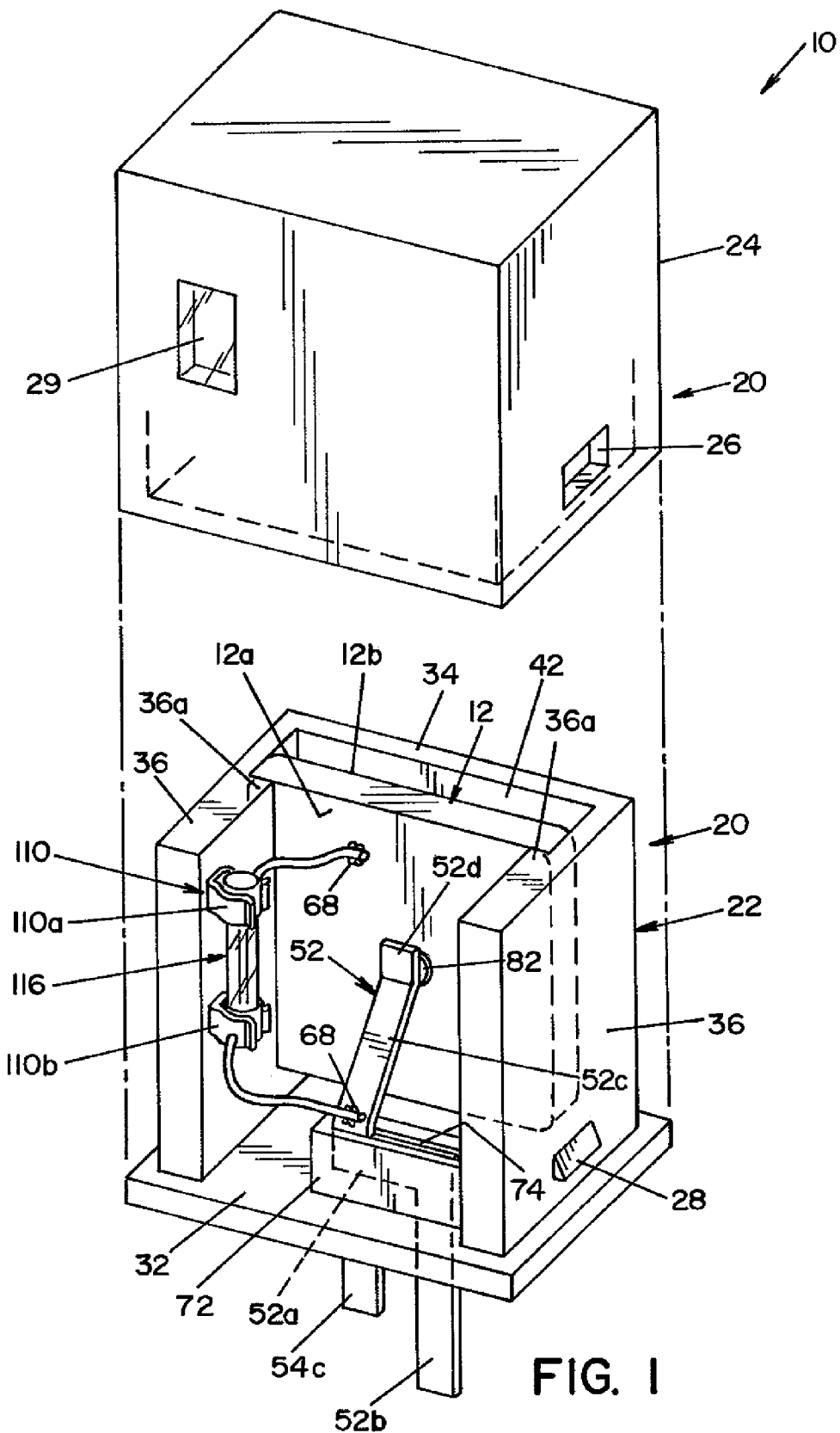
FIG. 1 is an exploded, pictorial view of a circuit protection device illustrating a preferred embodiment of the present invention.

Referring now to the drawings wherein the showings are for the purpose of illustrating a preferred embodiment of the invention only, and not for the purpose of limiting same, FIG. 1 is an exploded perspective view of a transient voltage suppression device 10 for use with a power distribution system for preventing voltage fault conditions from reaching a sensitive circuit load.

Voltage suppression device 10 is generally comprised of a voltage sensitive element 12 that is contained within a housing 20. Housing 20 is comprised of a base section 22 and a cover section 24. Base section 22 is adapted to receive and hold the operative elements of a voltage suppression device 10. To this end, base section 22 includes a generally planar bottom wall portion 32. A generally U-shaped structure, comprised of a back wall 34 and opposed side walls 36, extends from bottom wall 32. Each side wall 36 includes an inward extending wall section 36a that is spaced from back wall 34. Side walls 36 are formed to define a cavity 42 adjacent to back wall 34. Cavity 42 is dimensioned to receive voltage sensitive element 12. In the embodiment shown, voltage sensitive element 12 is rectangular in shape, and therefore, cavity 42 is rectangular in shape. As will be appreciated by those skilled in the art, voltage sensitive element 12 may be cylindrical in shape, and thus the bottom portion of cavity 42 may be semi-cylindrical in shape to receive a cylindrical element.

Referring now to voltage sensitive element 12, in accordance with the present invention, such element is voltage sensitive and operable to heat up when a voltage applied across the device exceeds a preselected voltage. In accordance with the present invention, voltage sensitive element 12 is preferably comprised of a metal-oxide varistor (MOV).

By way of background, MOVs are primarily comprised of zinc oxide granules that are sintered together to form a disc. Zinc oxide, as a solid, is a highly conductive material. However, minute air gaps or grain boundaries exist between the sintered zinc oxide granules in a MOV, and these air gaps and grain boundaries inhibit current flow at low voltages. At higher voltages, the gaps and boundaries between the zinc oxide granules are not wide enough to block current flow, and thus the MOV becomes a highly conductive component. This conduction, however, generates significant heat energy in the MOV. MOVs are typically classified and identified by a "nominal voltage." The nominal voltage of an MOV, typically identified by $V_{N(DC)}$, is the voltage at which the device changes from an "off state" (i.e., the state where the MOV is generally non-conductive) and enters its conductive mode of operation. Importantly, this voltage is characterized at the 1 mA point and has specified minimum and maximum voltage levels, referred to hereinafter as $V_{MIN}$ and $V_{MAX}$ respectively. By way of example, and not limitation, a metal-oxide varistor (MOV) having a nominal varistor voltage, $V_{N(DC)}$, of 200 volts may actually exhibit a change from its generally non-conductive to its conductive state at a voltage between a minimum voltage, $V_{MIN}$, of 184 volts and a maximum voltage, $V_{MAX}$, of 228 volts. This range of operating voltages for a MOV of a rated nominal voltage $V_{N(DC)}$ is the result of the nature of the device. In this respect, the actual voltage value of a MOV basically depends on the thickness of the MOV and on the number and size of the zinc oxide granules disposed between the two electrode surfaces. At the present time, it is simply impossible, because of the construction and composition of metal-oxide varistors, to produce identical devices having identical operating characteristics.

Thus, although MOV 12 of over-voltage protection device 10 preferably has a rated "nominal voltage" $V_{N(DC)}$ at 1 mA, the actual voltage at which MOV 12 and every other MOV changes from a non-conducting state to a conducting state may vary between a $V_{MIN}$ and a $V_{MAX}$ for the rated nominal voltage value.

Referring again to base section 22 of housing 20, as best seen in FIGS. 1-4, cavity 42 is dimensioned to be significantly deeper (i.e. thicker) than the thickness of MOV 12, for reasons that shall be described in greater detail below.

Figure 2:
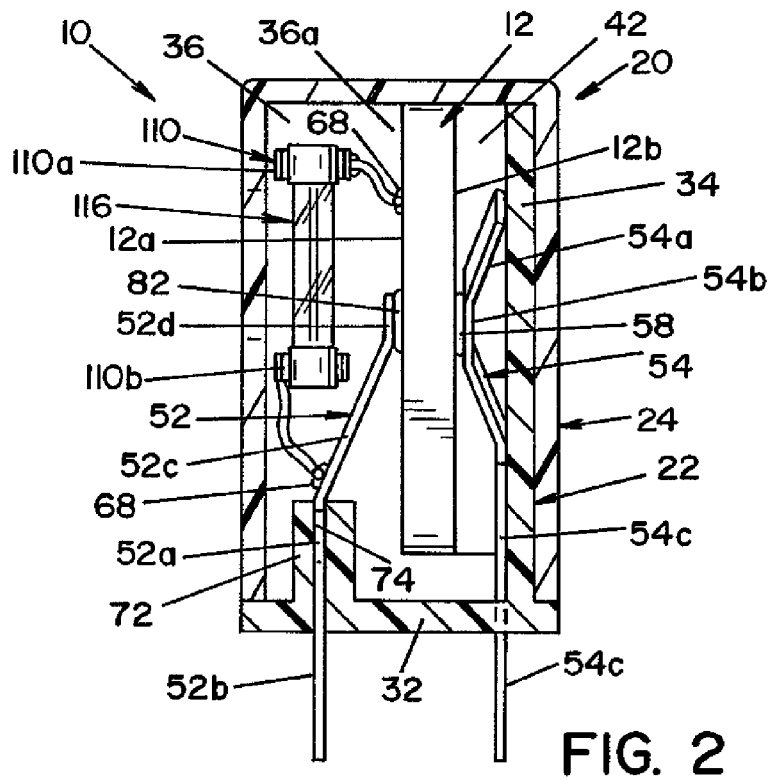
FIG. 2 is a cross-sectional, side view of the circuit protection device shown in FIG. 1 showing the device in a normal operating configuration.
Figure 3:
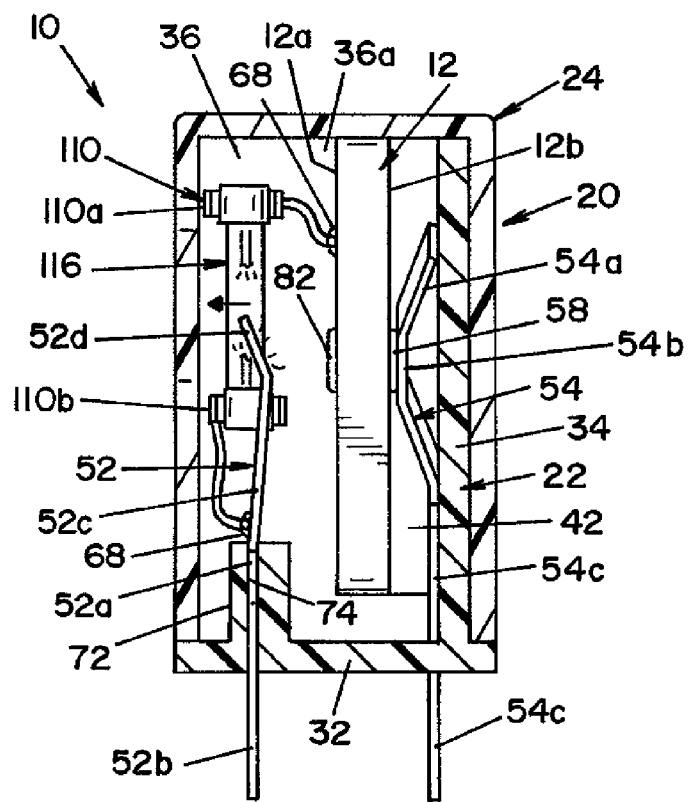
FIG. 3 is a cross-sectional, side view of the circuit protection device shown in FIG. 1 showing the device after actuation by a fault condition.

A pair of contact elements 52, 54 are provided for electrical attachment to the opposite sides of MOV 12. Referring now to FIGS. 2 and 3, contact element 54 includes a generally V-shaped body, designated 54a, having a generally flat mid-section 54b and a flat elongated leg portion 54c extending from one end thereof. Contact element 54 is dimensioned such that mid-section 54b is attached to surface 12b of MOV 12 by an electrically conductive material, designated 58 in the drawings. Conductive material 58 is preferably formed of a high temperature, metallic solder such as silver, lead or alloys thereof. With mid-section 54b attached to surface 12b of MOV 12, leg portion 54c is dimensioned to extend through an opening in bottom wall 32 of base section 22 and to project therefrom. The projecting portion of leg portion 54c is provided as a first lead electrically connectable to a first line (e.g., a ground or neutral line) of an electrical circuit, as shall be described hereinafter. In accordance with one aspect of the present invention, contact element 54 is formed of a spring metal. As best seen in FIGS. 2 and 3, contact element 54 is disposed between MOV 12 and back wall 34 of base section 22. V-shaped body portion 54a of contact element 54 is dimensioned to force MOV 12 away from back wall 34 when MOV 12 is inserted into cavity 42. In other words, in addition to being an electrically conductive component contact element 54 acts as a spring to force MOV 12 away from back wall 34 into contact with wall section 36a, as seen in FIG. 1.

In accordance with one aspect of the present invention, cavity 42 and contact element 54 allow housing 20 to receive MOVs of different thicknesses. In this respect many MOVs are formed to have the same overall shape, but vary only in thickness. The thickness of the MOV determines the rated "nominal voltage" $V_{N(DC)}$ of MOV 12. By providing a deep cavity 42 and contact element 54 having a spring biasing feature, different MOVs 12 of varying thicknesses may be used in housing 20, thereby enabling the formation of a voltage suppression device 10 having different voltage ratings. Regardless of the thickness of the MOV used, contact element 54 forces the MOV against wall section 36a, thereby positioning surface 12a of MOV 12 in the same relative position within housing 20.

Referring now to FIGS. 1-3, contact element 52 is best seen. Contact element 52 is comprised of a short body portion 52a having an elongated leg portion 52b and an elongated arm portion 52c. As best seen in FIG. 1, leg portion 52b and arm portion 52c extend from opposite ends of body portion 52a in opposite directions. A finger portion 52d extends from one end of arm portion 52c.

Like contact element 54, contact element 52 is formed of a conductive spring metal. In a normal configuration, body portion 52a, leg portion 52b and arm portion 52c are flat and lie in the same general plane. Finger portion 52d is bent to one side of this plane. Contact element 52 is mounted to base section 22 in a generally rectangular mounting boss 72 that extends from both bottom wall 32 and a side wall 36. Mounting boss 72 includes a slot 74, best seen in FIG. 1, dimensioned to receive body portion 52a. An opening that communicates with slot 74 extends through bottom wall 32. The opening is dimensioned to receive leg portion 52b of contact element 52. Slot 74 is dimensioned such that contact element 52 may be press-fit into mounting boss 72, with a portion of leg portion 52b extending through and beyond bottom wall 32 of base section 22, as seen in FIGS. 2 and 3. Contact element 52 is dimensioned such that arm portion 52c extends from mounting boss 72. In accordance with the present invention, arm portion 52c is forced back toward MOV 12 and is held in position by a solder material 82 that secures planar finger portion 52d to surface 12a of MOV 12. Unlike high temperature solder 58, solder material 82 is preferably formed of a material that has a relatively low softening temperature or melting temperature. A melting temperature, metal alloy or a polymer having a low softening temperature may be used. Specifically, solder material 82 is preferably a solid at room temperature (25° C.), and is a solid up to temperatures around 65° C. Preferably, solder material 82 has a melting temperature or a softening temperature of between about 70° C. and about 140° C., and more preferably, has a melting temperature or a softening temperature of between about 100° C. and about 120° C.

In the embodiment shown, solder material 82 is formed of an electrically conductive material or fusible alloy that has a melting temperature of about 118° C. The exposed surface of the zinc oxide granules of MOV 12 allows the solder material 82 to adhere to the surface of MOV 12. When soldered to MOV 12, arm portion 52c of contact element 52 is in a first position, best seen in FIG. 2. Absent solder material 82, arm portion 52c would move away from MOV 12 to its normal planar configuration aligned with body portion 52a and leg portion 52b. Solder material 82, thus maintains contact element 52 in electrical contact with surface 12a of contact MOV 12. Contact element 52 is adapted to be a second lead that is electrically connectable to a second line (e.g., a power line) of an electrical circuit, as shall be hereinafter be described.

A fuse element 116 is electrically connected between surface 12a of MOV 12 and contact element 52. In the illustrated embodiment, fuse element 116 takes the form of a conventional cartridge fuse mounted in a fuseholder 110. Fuseholder 110 is comprised of a pair of fuse clips 110a and 110b that are fixed to side wall 36. Fuse clips 110a, 110b allow for convenient installation and removal of fuse element 116. It will be appreciated that fuseholder 110 may be located at other locations within housing 20, or alternatively may be located external to housing 20. Fuse clip 110a is electrically connected by a wire (or other suitable conductor) to surface 12a of MOV 12. Likewise, fuse clip 110b is electrically connected to contact element 52 by a wire (or other suitable conductor). A high temperature solder 68 secures the respective wires to surface 12a of MOV 12 and contact element 52. High temperature solder 68 is similar to the high-temperature conductive material 58 used to secure contact element 54 to surface 12b of MOV 12. Fuse element 116 preferably has a current rating in the range of about 0.1 to about 5 amps, and a voltage rating between about 250V and 600V.

Cover portion 24 of housing 20 is generally rectangular in shape and defines a cavity that is dimensioned to enclose base section 22 and the components mounted thereon. Cover section 24 is adapted to be attached to base section 22. Cover section 24 and base section 22 are preferably formed of a molded plastic material and may be joined by ultrasonic welding. In the embodiment shown, apertures 26 are formed in cover section 24 to receive tabs 28 projecting from side walls 36 of base section 22. The illustrated embodiment of cover section 24 also includes an opening or window 29 to allow fuse element 116 to be viewed through housing 20. Cover section 24 is secured to base section 22 in snap lock fashion as is conventionally known.

Figure 4:
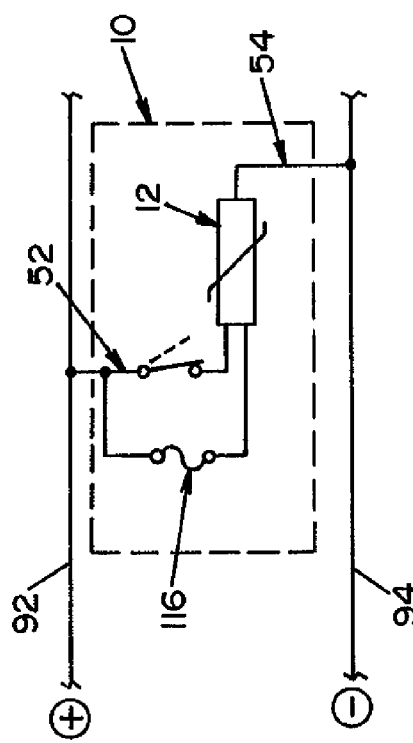
FIG. 4 is a schematic circuit diagram of the circuit protection device shown in FIG. 1, as connected to an electrical circuit.

FIG. 4 shows a schematic circuit diagram of voltage suppression device 10 as connected to an electrical circuit. A normally closed, thermal switch, comprised of one end of contact element 52, is electrically connected in series with MOV 12, between the power line 92 of the electrical circuit and MOV 12. The thermal switch is thermally coupled to MOV 12, wherein the thermal switch moves from a normally closed position to an open position to form a gap between the thermal switch and MOV 12 when the temperature of MOV 12 reaches a level indicating an over-voltage condition. Fuse element 116 is connected in parallel with the thermal switch, between MOV 12 and power line 92. Contact element 54 is connected to ground or neutral line 94 of the electrical circuit.

In response to the thermal switch moving to an open position, the conductive path is shunted by fuse element 116. Therefore, residual follow-on current flows through fuse element 116 when the thermal switch opens. Conduction of the current continues through fuse element 116 until fuse element 116 melts (i.e., blows), thereby opening the electrical path between voltage sensitive element 12 and the power line. Electrical arcing is contained within fuse element 116 until extinguished. It is believed that fuse element 116 may reduce the magnitude of arc energy resulting from the opening of the thermal switch.

It will be appreciated that voltage suppression device 10 may be alternatively connected to the electrical circuit, such that contact element 52 is connected to ground or neutral line 94 of the electrical circuit, contact element 54 is connected to power line 92 of the electrical circuit, and fuse element 116 is connected in parallel with the thermal switch between MOV 12 and ground or neutral line 94.

Figure 5:
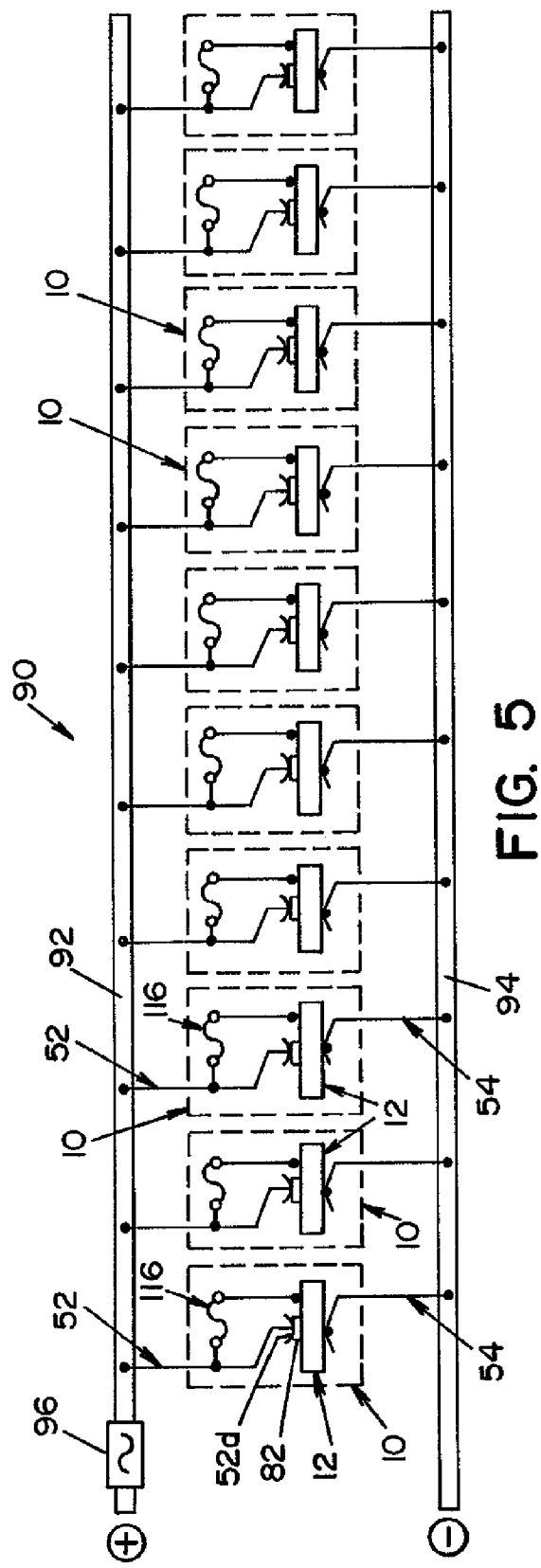
FIG. 5 is a schematic view of a circuit protection array comprised of ten circuit protection devices as shown in FIG. 1.

Referring now to the operation of voltage suppression device 10, one or more voltage suppression devices 10 may be used together to protect an electrical circuit against an over-voltage fault. FIG. 5 schematically shows a voltage suppression system 90 comprised of ten voltage suppression devices 10. Each voltage suppression device 10 in system 90 has the same rated "nominal voltage" $V_{N(DC)}$ and a peak current surge rating. The current surge protection afforded by system 90 is thus approximately ten times the peak current surge rating of a voltage suppression device 10 used in system 90. For example, if each voltage suppression device 10 has a peak current surge rating of 10,000 amps, system 90 has a peak current surge rating of 100,000 amps. As indicated above, although each voltage suppression device 10 may have the same "rated nominal voltage," in actuality, the "rated nominal voltage" of each of the MOVs within a voltage suppression device 10 may vary between a $V_{MIN}$ and a $V_{MAX}$. As a result the current surge experienced by each voltage suppression device 10 may not occur at the same instant as shall hereinafter be described.

Each voltage suppression device 10 is connected across a power line designated 92 and a ground or neutral line designated 94. Specifically, contact element 52 of each voltage suppression device 10 is connected to power line 92 and contact element 54 of each voltage suppression device 10 is connected to ground or neutral line 94. It will of course be appreciated that voltage suppression device 10 may alternatively be connected across power line 92 and ground or neutral line 94 such that contact element 52 is connected to ground or neutral line 94 and contact element 54 is connected to power line 92. In the embodiment of voltage suppression system 90 shown, a fuse element 96 precedes suppression system 90 and power line 92 to prevent an over-current condition in excess of what system 90 can handle from reaching system 90 and the circuit to be protected (not shown). In the system described above, i.e., a system 90 having ten voltage suppression devices 10, each having a peak current surge rating of 10,000 amps, fuse element 96 would have a current rating of about 100,000 amps. When connected as shown in FIG. 5, MOV 12 of each voltage suppression device 10 senses the voltage across power line 92 and ground or neutral line 94. Absent any over-voltage fault condition, each voltage suppression device 10 has a first state, as depicted in FIG. 2, wherein finger portion 52d of contact element 52 is in electrical contact with surface 12a of MOV 12 through low temperature solder material 82.

During a fault, an over-current condition or an over-voltage condition may appear. In the event of a high over-current condition that is in excess of the total peak current surge ratings for all voltage suppression devices 10 in system 90, fuse element 96 will open, thereby disconnecting system 90 from the electrical supply and preventing damage to the system components. In the event of an over-voltage condition or repetitive pulse condition, MOVs 12 of voltage suppression devices 10 will experience an over-voltage condition. When this occurs, thermal energy is created by the surge current and each MOV 12 begins absorbing energy and dissipating such energy as heat. As the voltage across an MOV 12 becomes larger, electrical conductivity of the MOV 12 increases and increased amounts of heat are thereby generated. As indicated above, because the actual characteristics of each MOV 12 are not identical, one MOV will have a lower energy rating and a faster thermal response time as contrasted to the others. Thus, various MOVs will heat up more rapidly than other MOVs within voltage suppression system 90. If the fault condition is severe enough, the MOV of one or more voltage suppression devices 10 will heat up to the melting temperature of low temperature solder material 82. When this occurs, arm portion 52c of contact element 52 is no longer held in its first position (as shown in FIG. 2). When solder material 82 melts, arm portion 52c is free to move away from surface 12a of MOV 12, as the spring metal material forming contact element 52 seeks to return to its normal planar configuration.

When arm portion 52c moves away from MOV 12, the conductive path through contact element 52 is broken. However, the conductive path is shunted by the fuse element 116. Therefore, residual follow-on current flows through fuse element 116 until fuse element 116 melts (i.e., blows), thereby effectively taking the related voltage suppression device 10 "off-line." A blown fuse element 116 can be observed through opening or window 29. Electrical arcing is contained within fuse element 116 until extinguished. After fuse element 116 has "melted," the electrical path between power line 92 and voltage sensitive element 12 remains permanently open.

When one voltage suppression device 10 drops "off-line," the current surge rating of the entire suppression system 90 is reduced. Using the example set forth above, if one voltage suppression device 10 drops "off-line," system 90 will lose the 10,000 ampere surge capability of the dropped device 10, but would still have a current surge rating of 90,000 amps, until such time as the off-line voltage suppression device 10 is replaced.

The present invention thus provides a voltage suppression device 10 that may be used alone or in conjunction with other similar devices to form a voltage suppression system. Voltage suppression device 10 is a self-contained unit that is operable to suppress voltage spikes in a circuit and drop off-line when the voltage spike significantly exceeds the rated nominal voltage of the device to be protected thereby preventing catastrophic failure of the same.

Figure 6:
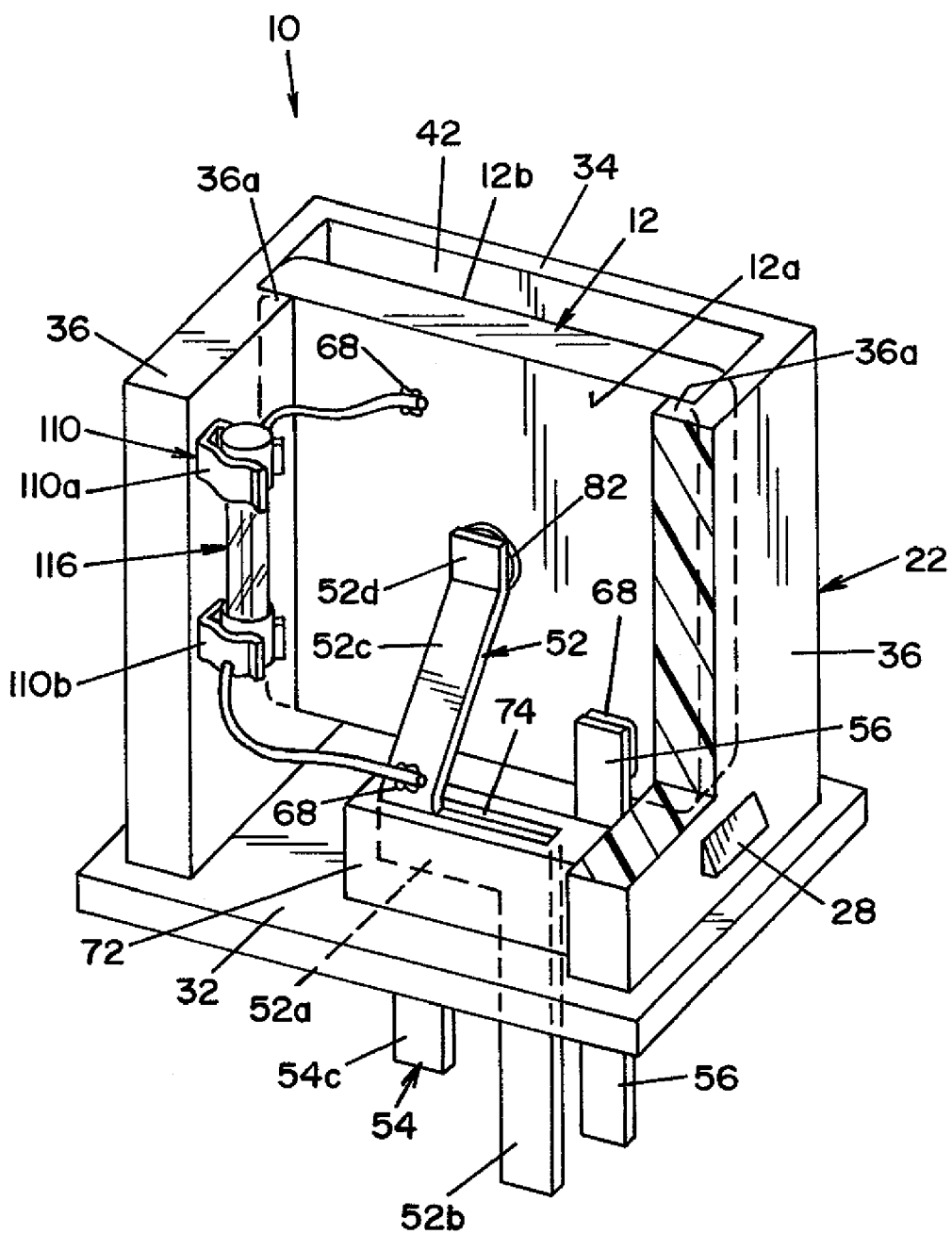
FIG. 6 is a partially sectioned, perspective view of the circuit protection device, illustrating a first alternate embodiment of the present invention.

Referring now to FIG. 6, an alternate embodiment of the present invention is shown. FIG. 6 basically shows a base section 22 having MOV 12 and contact elements 52 and 54 mounted thereto. The device shown in FIG. 6 is essentially the same as the embodiment previously described, the difference being that a third contact element designated 56 is provided. Contact element 56 is a straight flat strip of a conductive metal. Contact element 56 is secured to surface 12a of MOV 12 by the high-temperature solder 68. Contact element 56 is dimensioned to extend through an opening (not shown) in bottom wall 32 and to project therebeyond. Contact element 56 provides an indicator lead that is attachable to an indicator device such as a light, alarm or the like, or may be used as a lead attached to a computer terminal to monitor the "state" of voltage suppression device 10. In this respect, so long as finger portion 52d remains in contact with surface 12a of MOV 12, power sensed by contact 52 is connected to contact element 56 along the conductive surface 12a of MOV 12. In the event of an over-voltage condition wherein finger portion 52d of contact element 52 disconnects from surface 12a of MOV 12, current to contact element 56 ceases. This change of state from a conductive state to a non-conductive state may be used to provide an indication of when voltage suppression device 10 has been tripped. The indicator device (e.g., light, alarm or the like) may be mounted to housing 20.

Figure 7:
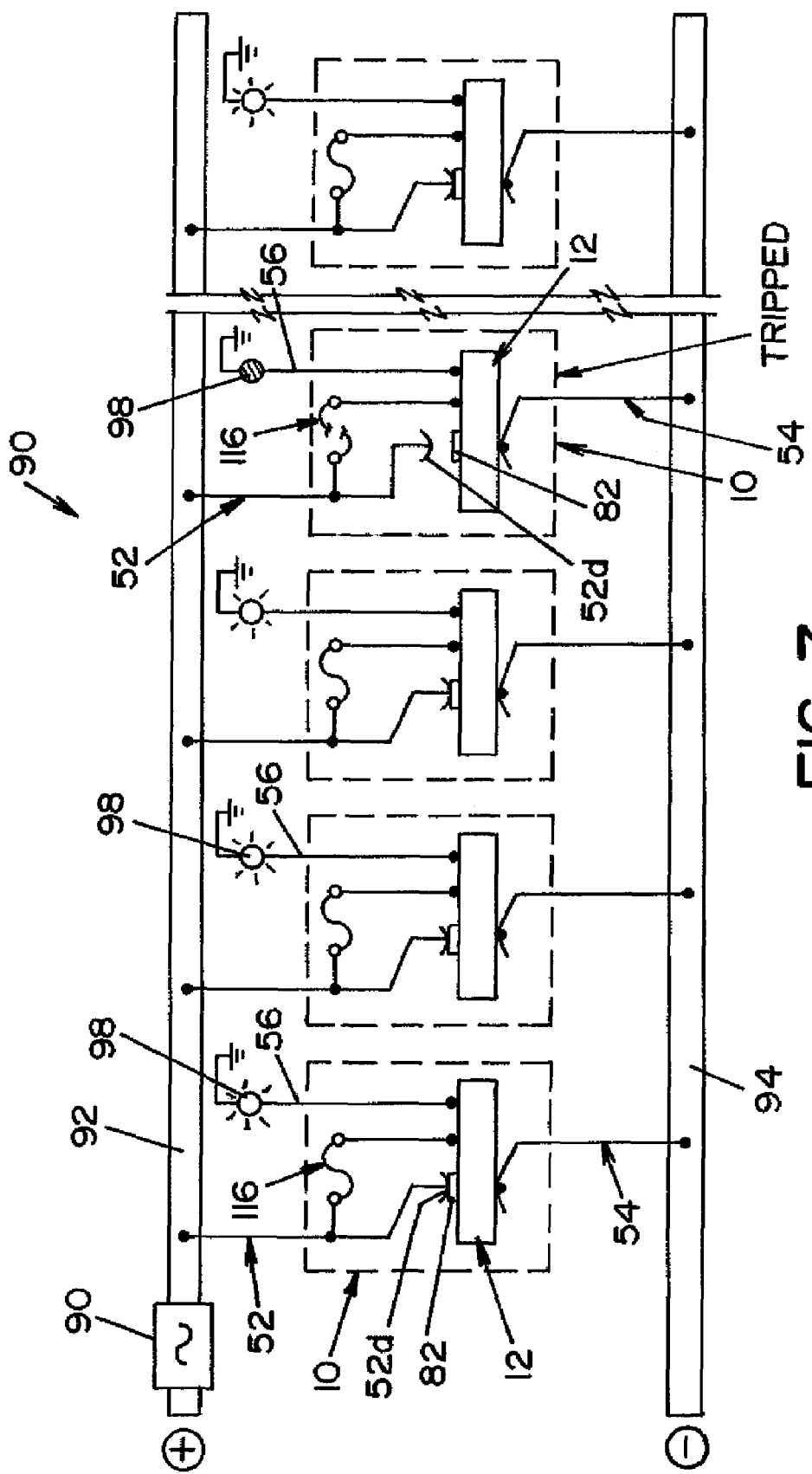
FIG. 7 is a schematic view of a circuit protection array comprised of a plurality of circuit protection devices as shown in FIG. 6.

FIG. 7 shows voltage suppression system 90, as previously shown in FIG. 5, including contact element 56 connected to an indicator, designated 98. By way of example, the fourth voltage suppression device 10 from the left is shown "tripped" (i.e. finger portion 52d has moved away from surface 12a) an indicator 98 is shown as non-illuminated. As indicated above, contact element 56 may be connected to a remote monitoring system that is operable to detect the change in electrical condition of contact element 56 and thereby provide an indication of the voltage suppression devices 10 in array 90 has "tripped" and needs replacement.

The foregoing describes preferred embodiments of the present invention. It should be appreciated that these embodiments are described for purposes of illustration only, and that numerous alterations and modifications may be practiced by those skilled in the art without departing from the spirit and scope of the invention. It is intended that all such modifications and alterations be included insofar as they come within the scope of the invention as claimed or the equivalents thereof.

Having described the invention, the following is claimed:

1. A voltage suppression device for suppressing voltage surges in an electrical circuit said device comprised of:

a voltage sensitive element having a first surface and a second surface and a predetermined voltage rating across said first and second surfaces, said voltage sensitive element increasing in temperature as voltage applied across said first and second surfaces exceeds said voltage rating;

a first terminal having one end electrically connected to said first surface of said voltage sensitive element and another end electrically connectable to a first line of the electrical circuit;

a thermal element electrically connected to said second surface of said voltage sensitive element, said thermal element being an electrically conductive solid at room temperature and having a predetermined softening temperature;

a second terminal having one end in electrical connection with said second surface of said voltage sensitive element and another end electrically connectable to a second line of the electrical circuit, said voltage sensitive element sensing the voltage drop between said first and second lines of the electrical circuit, said second terminal being maintained in electrical contact with said voltage sensitive element by said thermal element and being biased away therefrom, wherein said second terminal moves away from electrical contact with said voltage sensitive element and breaks a first electrical current path if an over-voltage condition sensed by said voltage sensitive element exceeds the voltage rating of said voltage sensitive element and causes said voltage sensitive element to heat said thermal element beyond its softening point;

a fuse element having one end in electrical connection with said second surface of said voltage sensitive element and another end electrically connectable to the second line of the electrical circuit, said fuse element located along a second electrical current path parallel to the first electrical current path, wherein the second electrical current path is broken when the fuse element melts; and a housing enclosing said voltage sensitive element, said one ends of said first and second terminals, and said thermal element.

2. A voltage suppression device as defined in claim 1, wherein said voltage sensitive element is a metal oxide varistor (MOV).

3. A voltage suppression device as defined in claim 2, wherein said metal oxide varistor (MOV) is rectangular in shape.

4. A voltage suppression device as defined in claim 1, wherein said thermal element is a metal solder comprised of a fusible alloy.

5. A voltage suppression device as defined in claim 4, wherein said metal solder has a melting temperature in the range of about 100° C. to about 120° C.

6. A voltage suppression device as defined in claim 1, wherein said thermal element is an electrically conductive polymer.

7. A voltage suppression device as defined in claim 1, wherein said fuse element has a current rating in the range of about 0.1 to about 5 amps.

8. A voltage suppression device as defined in claim 1, further comprising a third terminal having one end in electrical connection with said second surface of said voltage sensitive element and another end connectable to an indicator device for indicating whether said second terminal is in electrical connection with said voltage sensitive element.

9. A voltage suppression device as defined in claim 8, wherein said indicator device is a light emitting device.

10. A voltage suppression device as defined in claim 8, wherein said indicator device is mounted to said housing.

11. A voltage suppression device as defined in claim 1, further comprising indication means for indicating the condition of said voltage suppression device.

12. A voltage suppression device as defined in claim 1, wherein said housing encloses said fuse element.

13. A voltage suppression device as defined in claim 12, wherein said housing includes an opening for viewing said fuse element.

14. A voltage suppression device as defined in claim 1, further comprising a fuseholder for holding said fuse element.

15. A voltage suppression device as defined in claim 14, wherein said fuseholder includes a pair of clips.

16. A voltage suppression device as defined in claim 1, wherein said first line of said electrical circuit is a ground or neutral line and said second line of said electrical circuit is a power line.

17. A voltage suppression device as defined in claim 1, wherein said first line of said electrical circuit is a power line and said second line of said electrical circuit is a ground or neutral line.

18. A voltage suppression device for suppressing voltage surges in an electrical circuit, said device comprised of:
    a voltage sensitive element having a predetermined voltage rating, said voltage sensitive element increasing in temperature as voltage applied across said voltage sensitive element exceeds said voltage rating;
    terminals for electrically connecting said voltage sensitive element between a first line of the electrical circuit and a second line of the electrical circuit;
    a normally closed, thermal switch comprised of one end of one of said terminals, a surface of said voltage sensitive element and a thermal element, said one end of one of said terminals being maintained in electrical contact with said surface of said voltage sensitive element by said thermal element, said thermal switch being electrically connected in series with said voltage sensitive element between said first line of said electrical circuit and said voltage sensitive element, said thermal switch being thermally coupled to said voltage sensitive element wherein said one of said terminals moves from a normally closed position wherein said one of said terminals is maintained in electrical contact with said surface of said voltage sensitive element to an open position wherein said one of said terminals moves out of electrical contact with said surface of said voltage sensitive element to form a gap between said one of said terminals and said voltage sensitive element when the temperature of said voltage sensitive element reaches a level causing said thermal element to melt; and
    a fuse element connected in parallel with the thermal switch, said fuse element having one end electrically connected to said voltage sensitive element and another end electrically connectable to said first line of the electrical circuit.

19. A voltage suppression device as defined in claim 18, wherein said voltage sensitive element is a metal oxide varistor (MOV).

20. A voltage suppression device as defined in claim 18, further comprising indication means for indicating the condition of said voltage suppression device.

21. A voltage suppression device as defined in claim 18, wherein said thermal switch is comprised of a contact element held in electrical contact with said voltage sensitive element by a thermal element, said contact element being biased away from said voltage sensitive element.

22. A voltage suppression device as defined in claim 21, wherein said thermal element is a low melting temperature solder material.

23. A voltage suppression device as defined in claim 18, further comprising a housing enclosing said voltage sensitive element.

24. A voltage suppression device as defied in claim 18, wherein said thermal element is a metal solder comprised of a fusible alloy.

25. A voltage suppression device as defined in claim 24, wherein said metal solder has a melting temperature in the range of about 100° C. to about 120° C.

26. A voltage suppression device as defined in claim 18, wherein said thermal element is an electrically conductive polymer.

27. A voltage suppression device as defined in claim 18, wherein said fuse element has a current rating in the range of about 0.1 to about 5 amps.

28. A voltage suppression device as defined in claim 18, wherein said housing encloses said fuse element.

29. A voltage suppression device as defined in claim 28, wherein said housing includes an opening for viewing said fuse element.

30. A voltage suppression device as defined in claim 18, further comprising a fuseholder for holding said fuse element.

31. A voltage suppression device as defined in claim 30, wherein said fuseholder includes a pair of clips.

32. A voltage suppression device as defined in claim 18, wherein said first line of said electrical circuit is a ground or neutral line and said second line of said electrical circuit is a power line.

33. A voltage suppression device as defined in claim 18, wherein said first line of said electrical circuit is a power line and said second line of said electrical circuit is a ground or neutral line.

* * * * *